Dec. 18, 1956 R. L. CRANE 2,774,131
METAL CUTTING BAND SAW WITH MANUALLY
CONTROLLABLE POWER DRIVEN WORK FEED
Filed Jan. 31, 1955 14 Sheets-Sheet 1

Inventor
Robert L. Crane

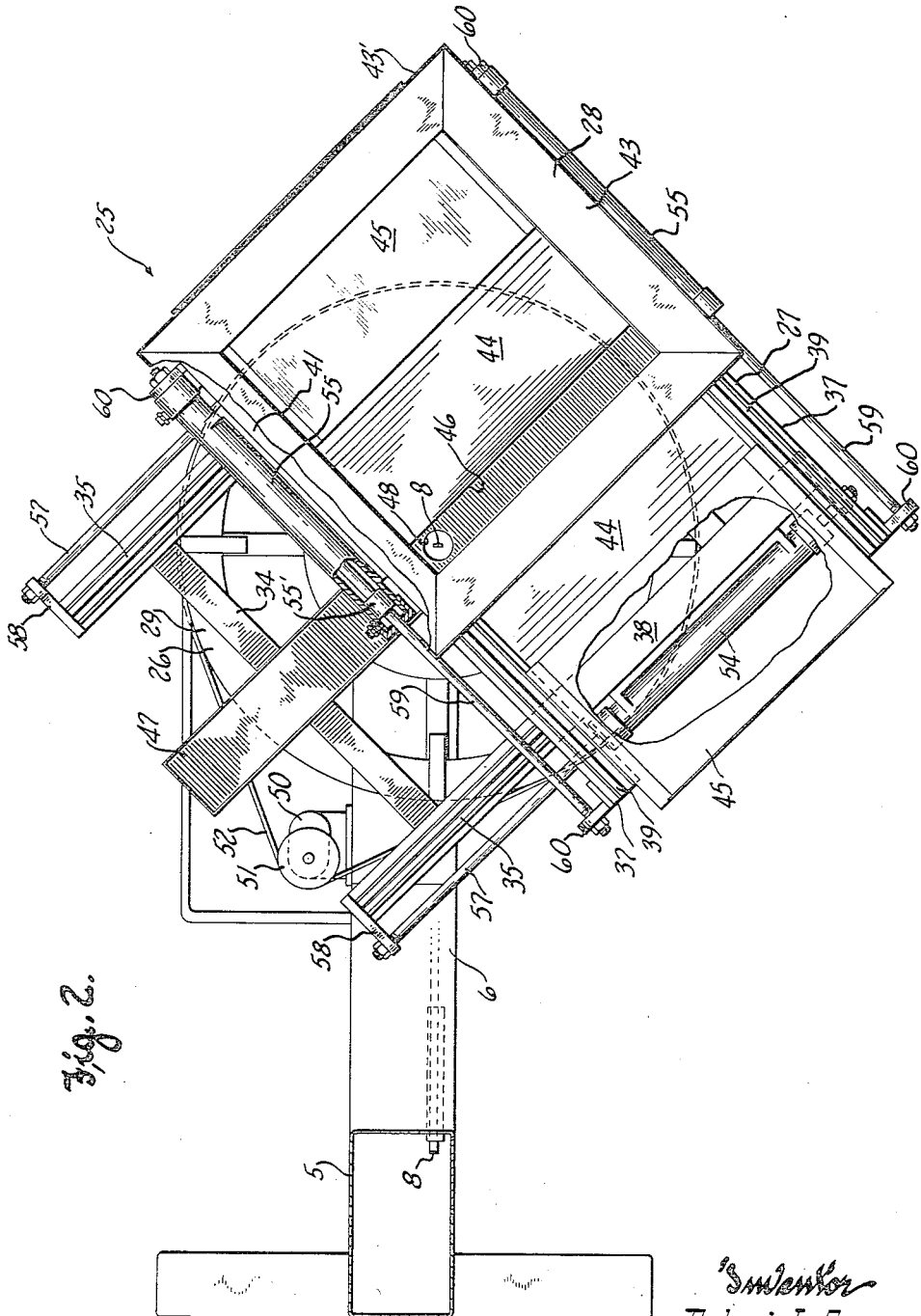

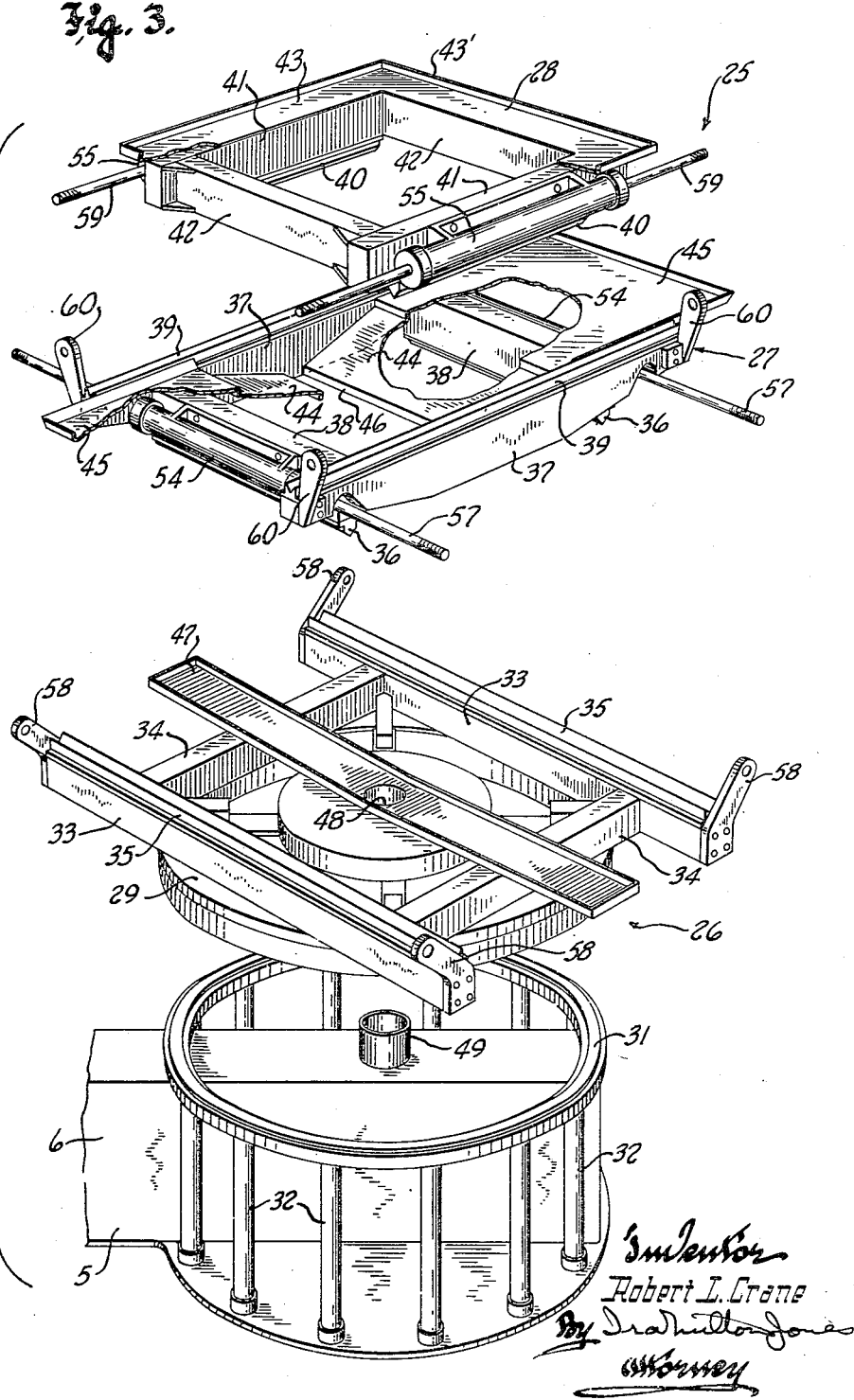

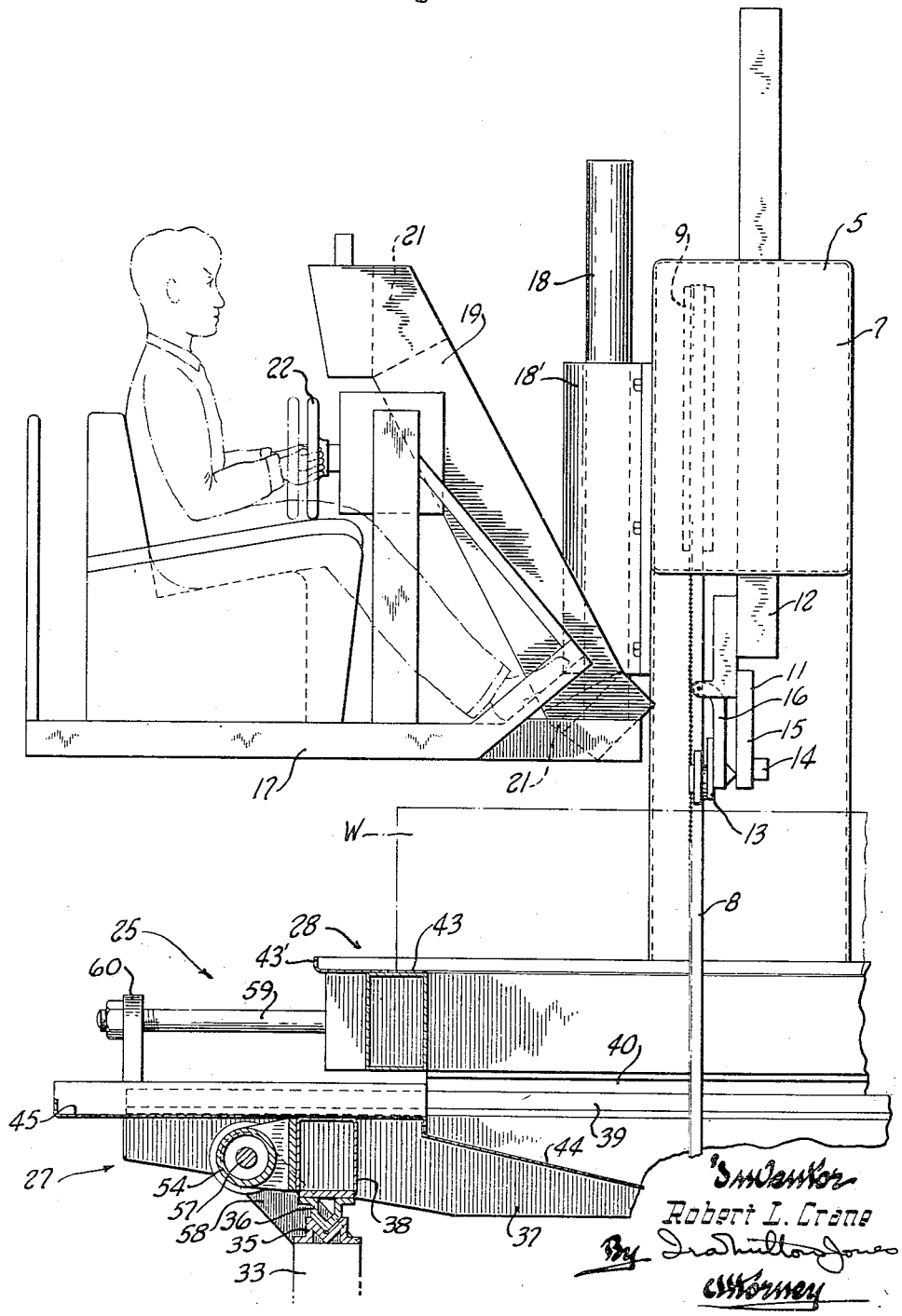

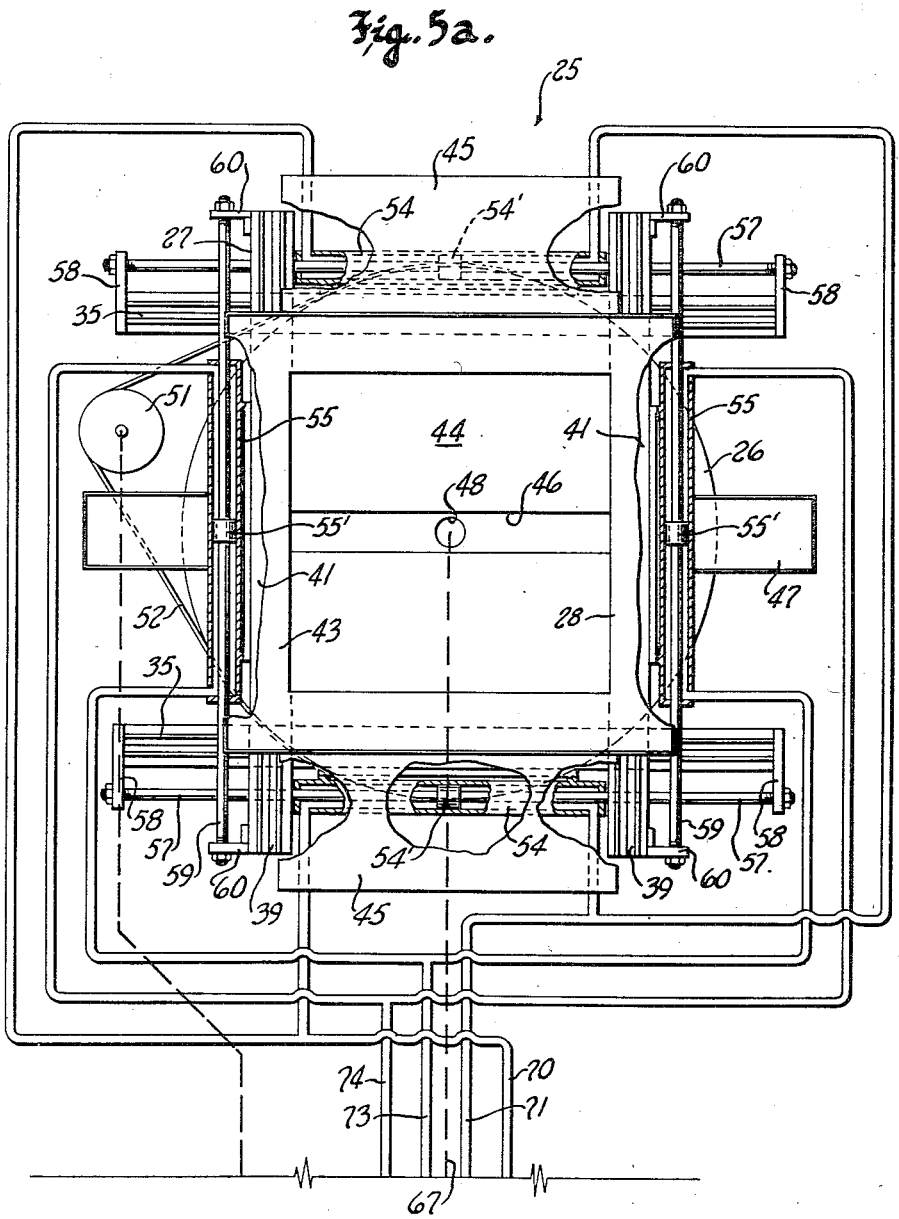

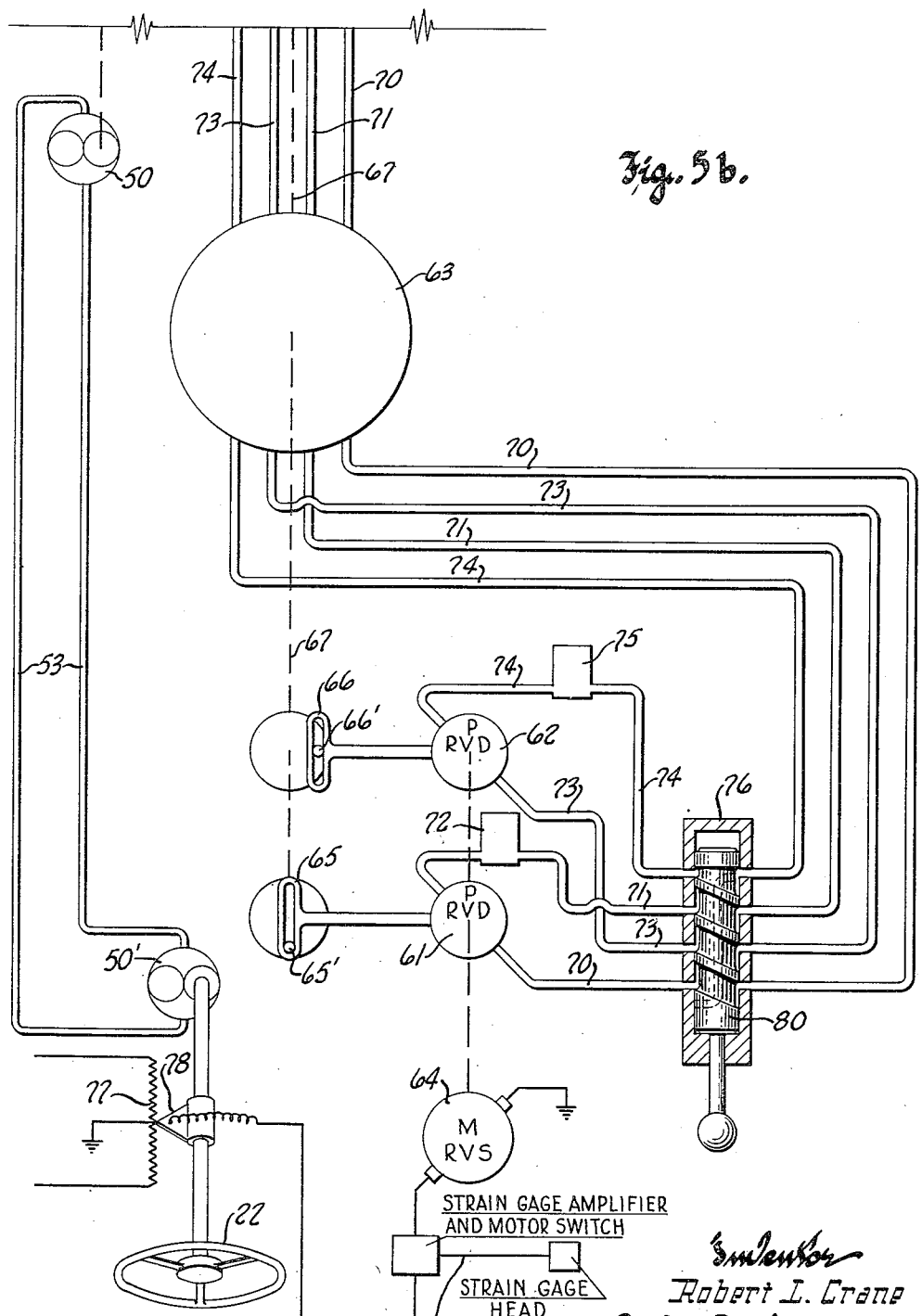

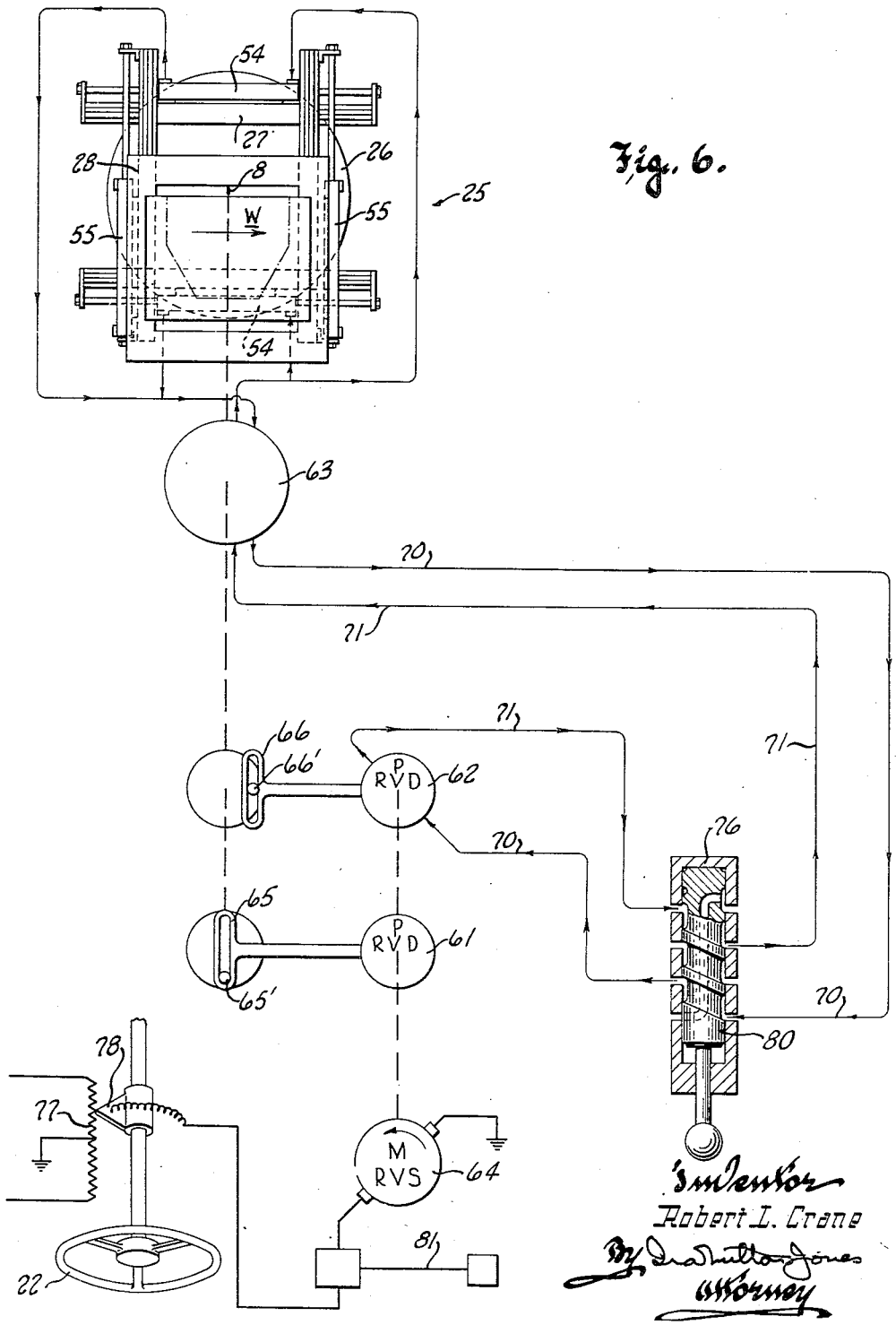

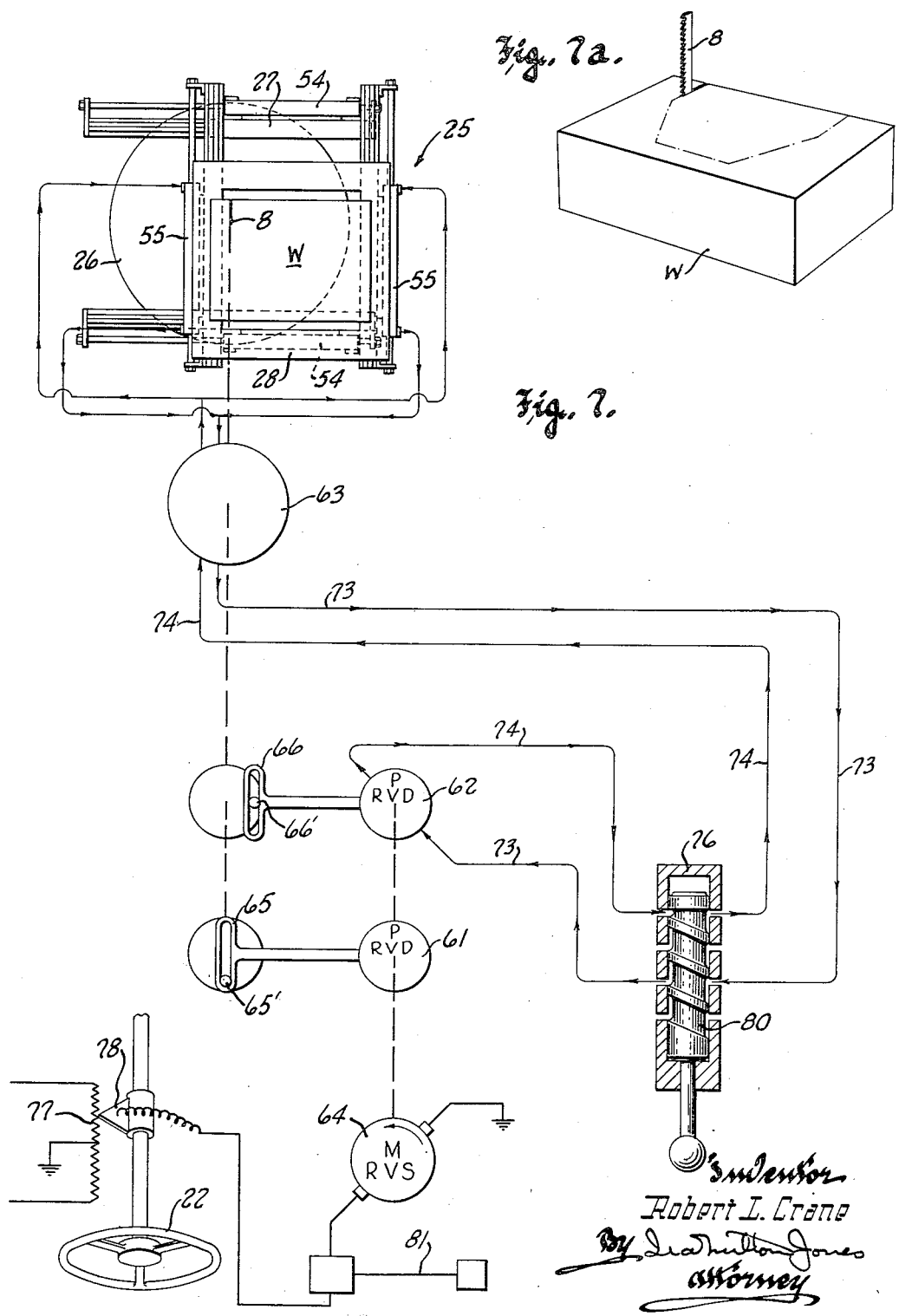

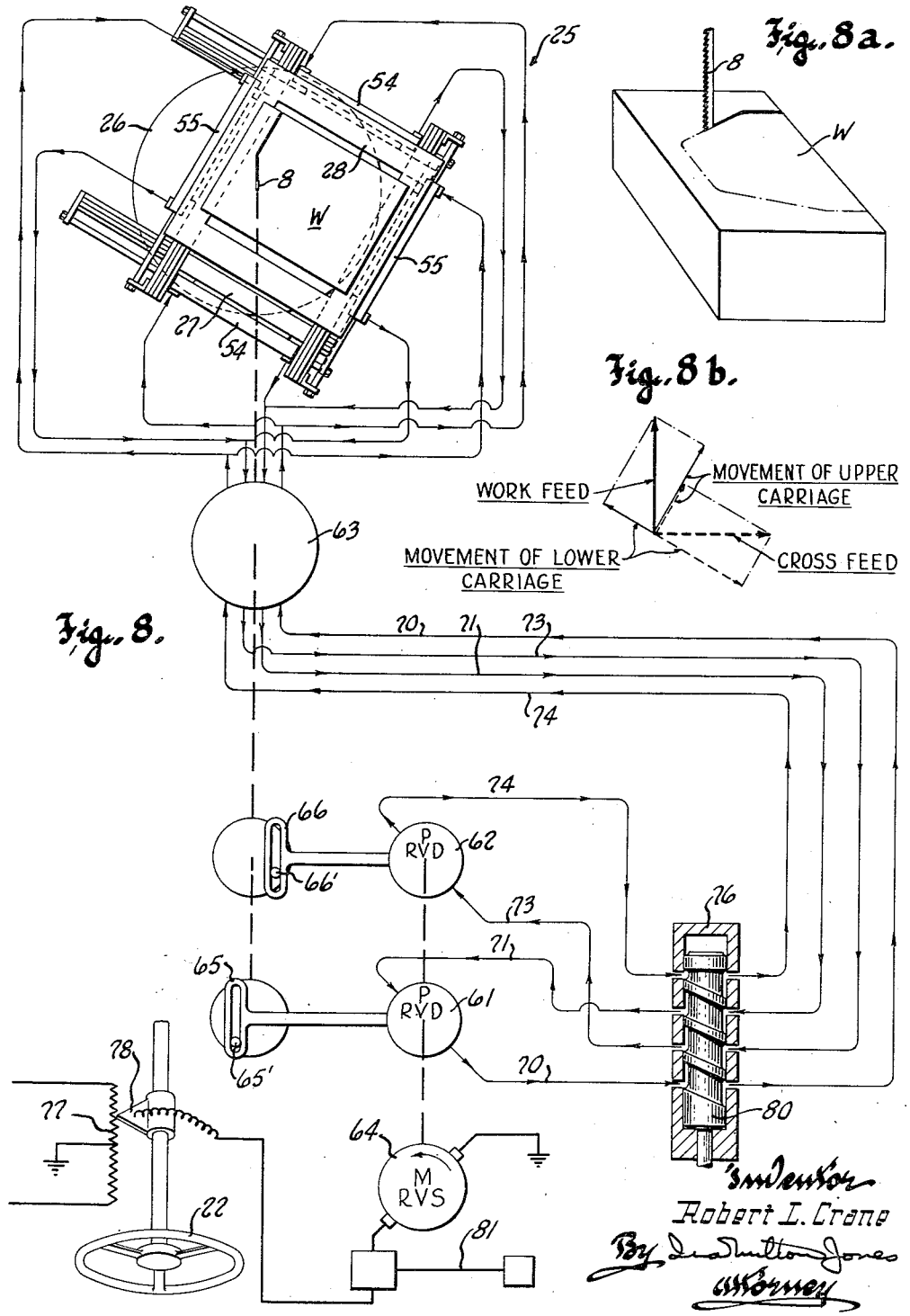

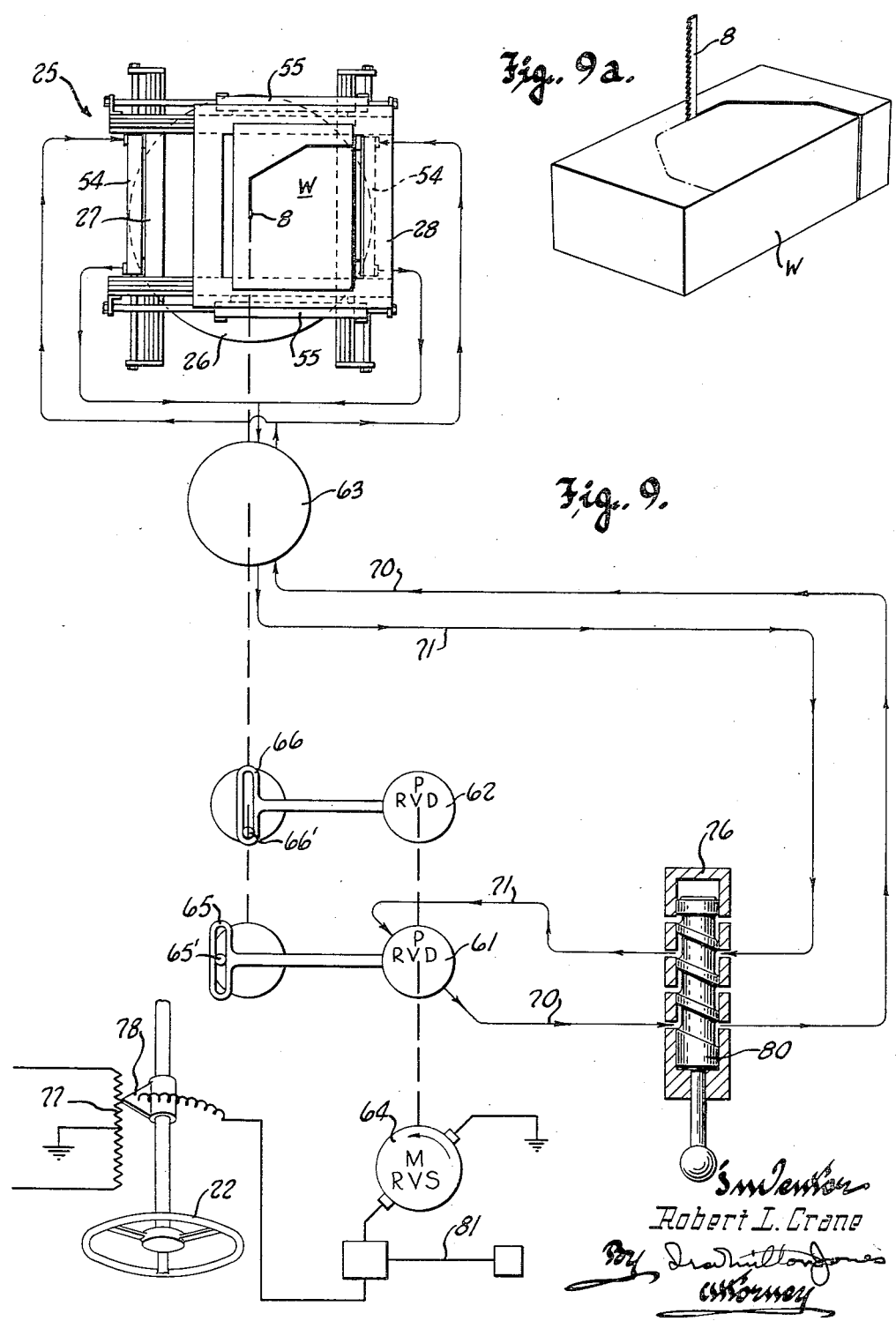

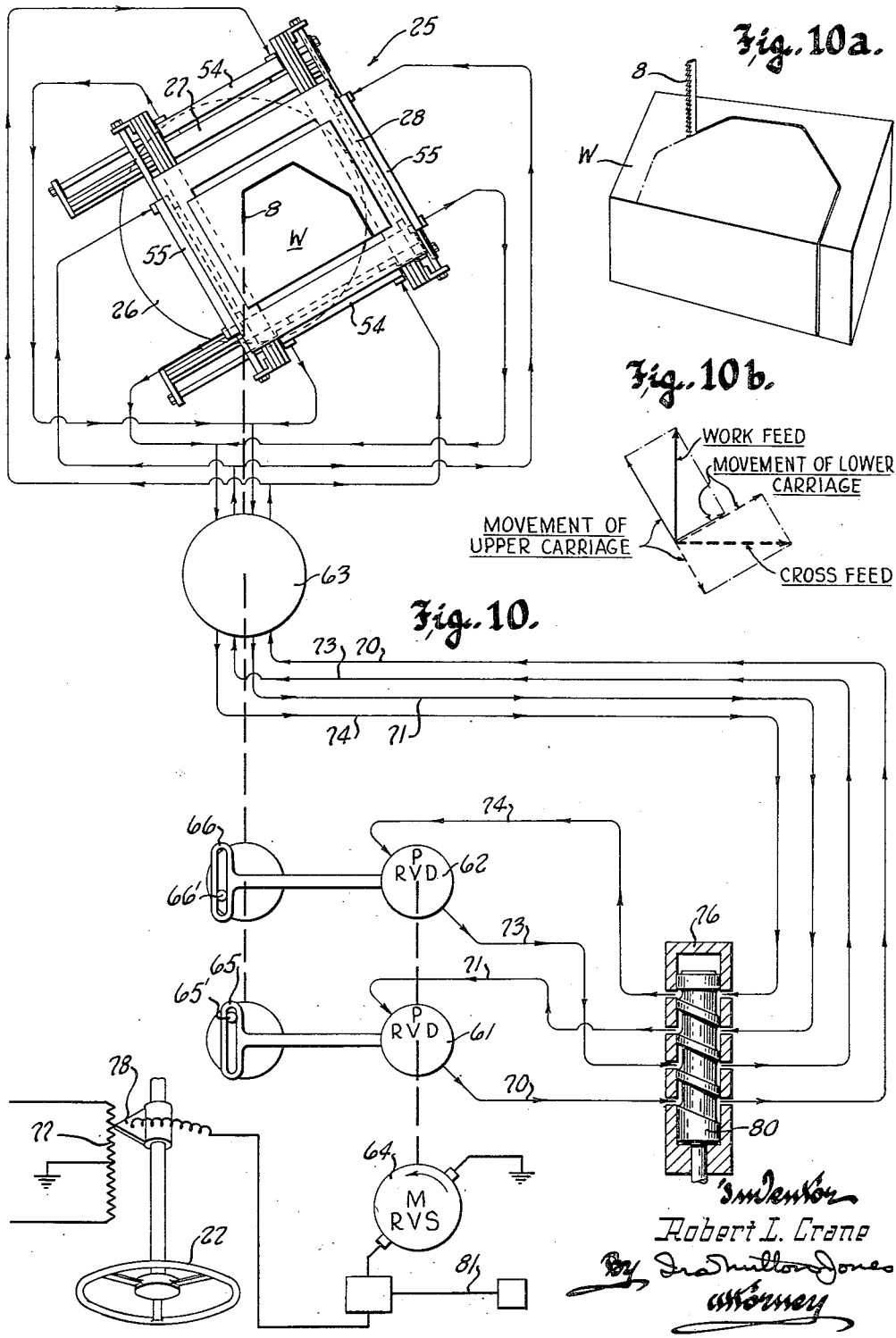

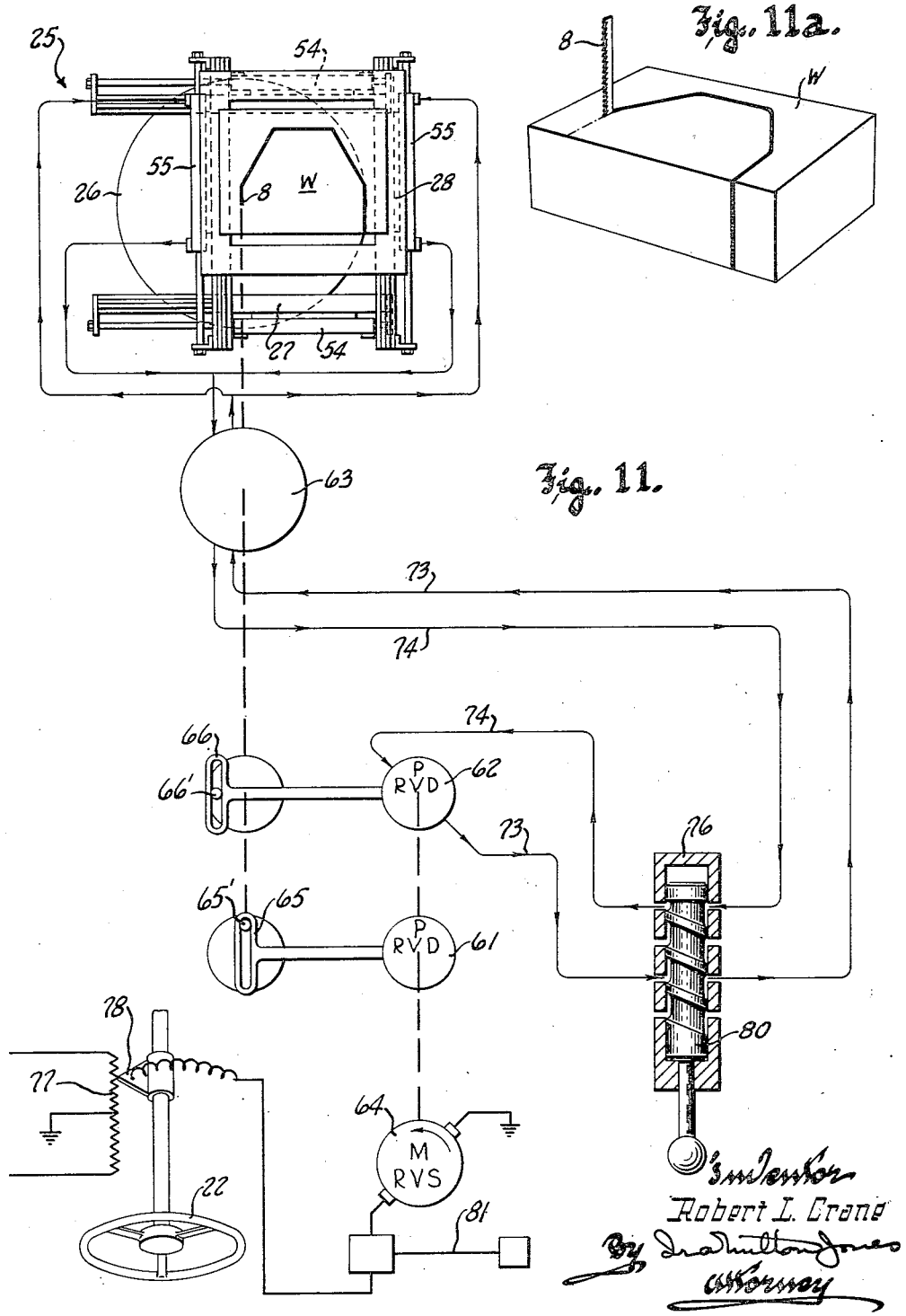

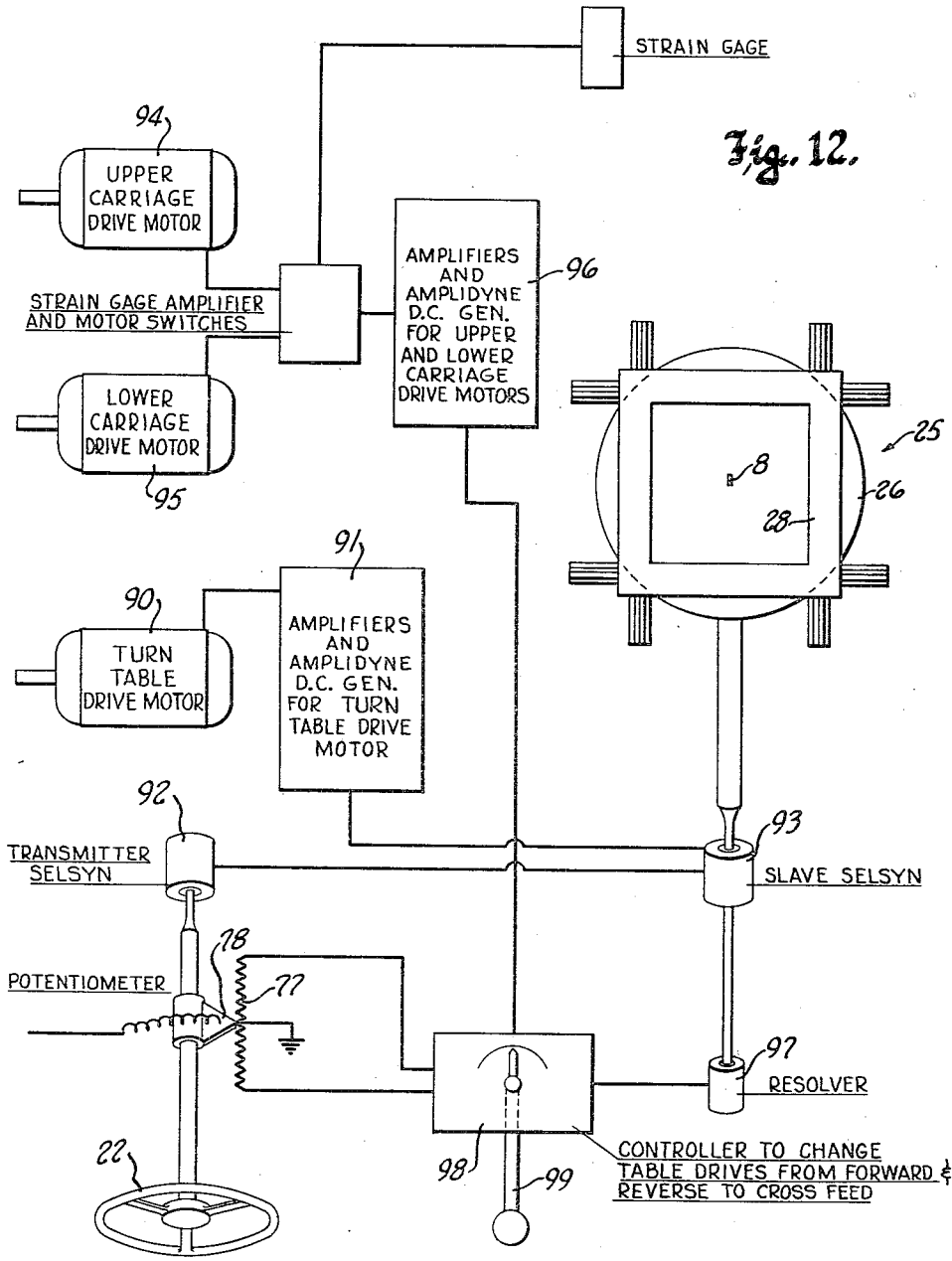

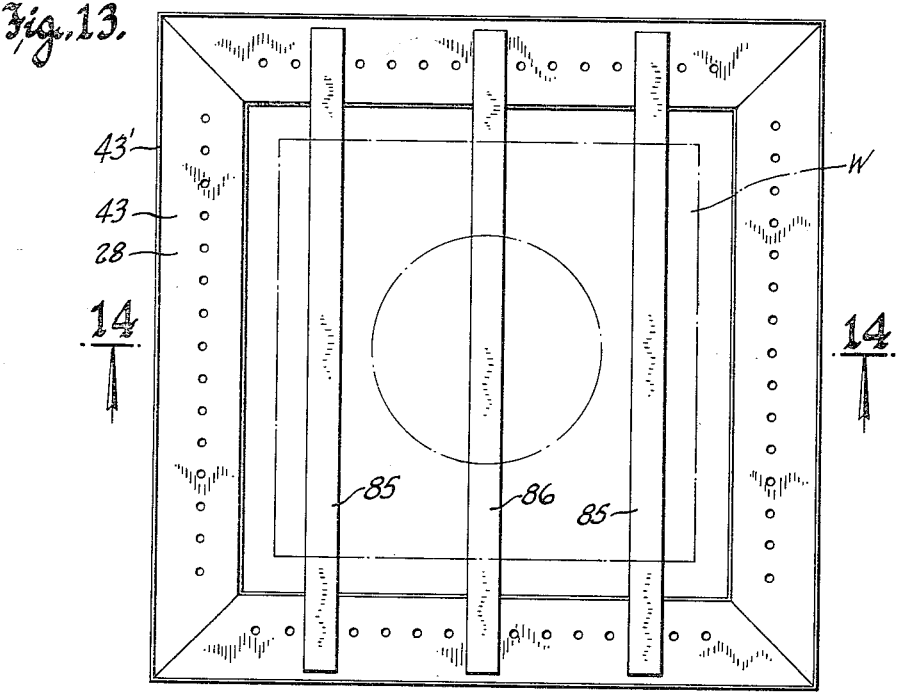
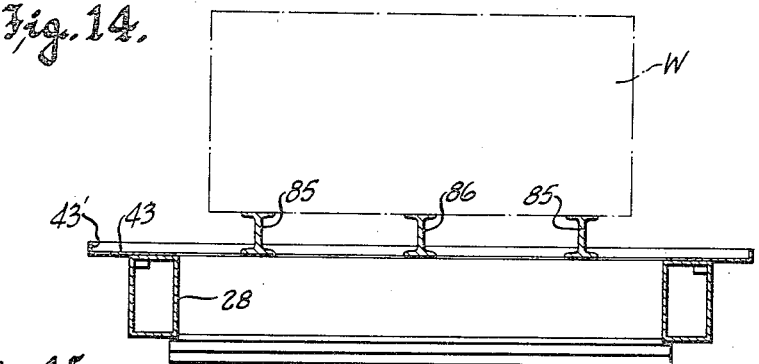
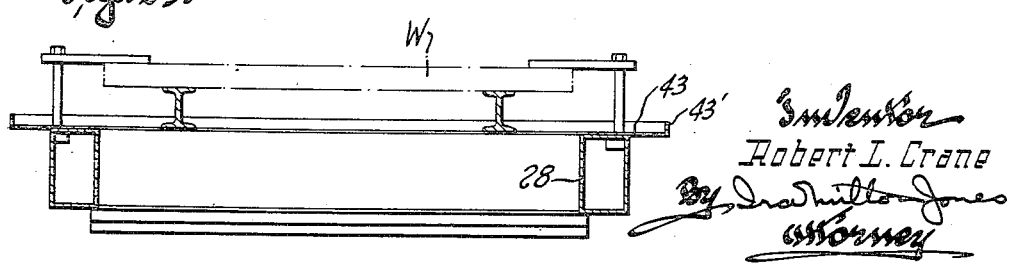

United States Patent Office 2,774,131
Patented Dec. 18, 1956

2,774,131

METAL CUTTING BAND SAW WITH MANUALLY CONTROLLABLE POWER DRIVEN WORK FEED

Robert L. Crane, Glen Lake, Minn., assignor to Continental Machines, Inc., Savage, Minn., a corporation of Minnesota Application January 31, 1955, Serial No. 484,904

6 Claims. (Cl. 29—68)

This invention relates to metal cutting band saws and has as its purpose to provide a band saw especially adapted to contour sawing of very large and heavy work.

Three separate feed motions are required to saw along a curved line with a band saw having a single cutting edge. There must be rotation about a vertical axis coincident with the path of travel of the saw band through the work zone, and linear motion along two right angularly disposed horizontal axes, with all of these motions so coordinated that the net result is the feeding of the work directly towards the toothed edge of the saw along a line parallel with the fixed plane to which the saw band is constrained as it travels through the work zone. To provide means by which this may be done accurately, despite the fact that the work piece being machined may weigh as much as ten tons, is the objective sought and attained by this invention.

To this end, it is an object of the invention to provide a band saw having a work carrying and feeding mechanism which comprises three superimposed relatively movable units, namely, a turntable mounted to rotate about a fixed vertical axis, a lower carriage supported upon the turntable and constrained to linear horizontal movement along a path extending diametrically across the turntable, and an upper carriage supported upon the lower carriage and constrained to linear horizontal movement relative thereto at right angles to the directions of motion of the lower carriage, the upper carriage being adapted to receive and hold the work piece.

Another object of this invention is to provide power means for driving the carriages back and forth, and a control for said power means including a coordinating element coupled to the turntable upon which the carriages are mounted and so governing the carriage driving means that the motions of the carriages are so automatically coordinated and related to one another that the vector sum of their motions is always in the direction to correctly feed the work to the saw regardless of the position of rotation of the turntable.

Another object of this invention is to provide a band saw of the character described wherein the work carrying and feeding mechanism is power actuated and either hydraulically or electrically driven, the power means in either event being manually controllable by a single control element which is movable in four directions—inward, to feed the work against the saw band; outward, to retract the work from the saw band; to the right to cause the work to turn about the saw band in that direction, and to the left to effect turning of the work about the saw band in that direction.

Another object of this invention is to incorporate in the work feed control a strain gage responsive to the pressure exerted by the work piece against the saw band to govern that pressure and limit it to a predetermined maximum value.

Another object of this invention is to provide a band saw of the character described with an operator's platform vertically adjustable and swingably supported from the upper arm of the main frame of the machine, so that the platform may be strategically positioned with respect to the work zone.

Still another object of this invention is to provide a simplified hydraulic power and control system for actuating the elements of the work carrying and feeding mechanism, to bring about smooth and accurate manually controlled feeding of the work against the saw band regardless of the contour of the cut to be made.

Since absolute uniformity in the set of the teeth of the saw band is a virtual impossibility, the work at times will tend to veer off the layout line toward one side or the other. This makes it necessary to effect a correction in the position of the work, which involves direct lateral shifting or cross feeding motion. Such direct lateral shifting of the work is also necessary during the initial positioning of the work. In recognition of the need for such cross feeding, the present invention has as another of its objects, the provision of means by which the operator can quickly disrupt the normal feeding of the work and introduce a 90° shift in the direction of the resultant linear feed, to thus change it from a longitudinal to a crosswise motion.

With the above and other objects in view, which will appear as the description proceeds, this invention resides in the novel method and construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best modes so far devised for the practical application of the principles thereof, and in which:

Figure 2 is a cross sectional view through Figure 1 on the plane of the line 2—2, with parts broken away to better illustrate details;

Figure 3 is an exploded perspective view of those parts of the machine which constitute the work carrying and feeding mechanism;

Figure 4 is a vertical sectional view on an enlarged scale through a portion of the machine and illustrating particularly the operator's control platform and its relationship to the work zone;

Figure 1:
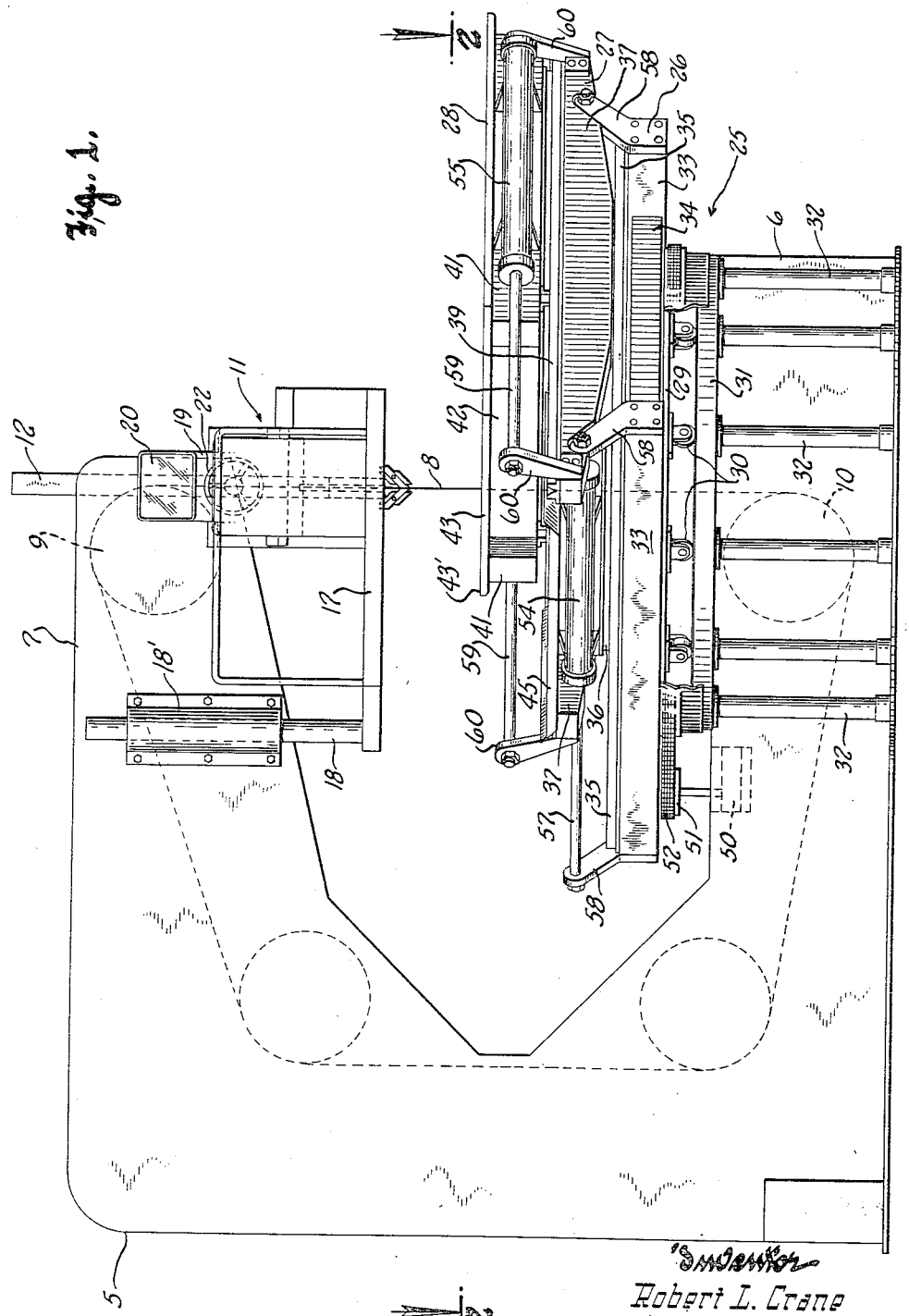
Figure 1 is a side elevational view of a band saw embodying this invention.

Figure 5A and 5B together comprise a diagrammatic view of the drive means for the various elements of the work carrying and feeding mechanism and controls therefor;

Figure 6 is a view diagrammatically illustrating the drive for the work carrying and feeding mechanism set to effect lateral shifting or cross feed of the work towards the right as required, for instance, to bring the work into proper position for the start of the substantially U-shaped cut delineated in Figure 7A;

Figure 7 is a diagrammatic view illustrating those elements of the drive means and the control therefor, involved during the formation of the first portion of the U-shaped cut shown in Figure 7A;

Figure 8 is a diagrammatic view similar to Figure 7, but illustrating how both carriages are driven at rates so coordinated that the vector sum of their motions feeds the work along the second angularly disposed portion of the cut to be made, as indicated in Figure 8A;

Figure 8B is a vector diagram depicting the work feed during the operation illustrated in Figure 8, and also, how the directions and rates of motion of the carriages would have to be altered to bring about a right cross feed with the work piece in the position shown in Figure 8;

Figure 9 is a diagrammatic view illustrating the condition of the drive elements and the controls therefor at the time the saw is forming that portion of the cut depicted in Figure 9A; and which, being at right angles to the initial portion of the cut involves motion of only the lower carriage;

Figure 10 is a diagrammatic view illustrating the condition of the drive elements and the controls therefor during the formation of the next portion of the cut as depicted in Figure 10A;

Figure 10B is a vector diagram similar to that of Figure 8B, but applied to the condition represented in Figure 10;

Figure 11 diagrammatically illustrates the elements of the work feeding system during the formation of the last leg of the U-shaped cut as illustrated in Figure 11A, and which is 180° from the path of the cut at the start thereof;

Figure 12 is a diagrammatic view illustrating an electrically powered drive and control system for the work carrying and feeding mechanism which may be used in lieu of the hydraulically actuated and controlled unit which is here presented as the preferred embodiment of this part of the invention;

Figure 13 is a plan view of the upper work supporting carriage, showing how a work piece in which a hole is to be cut, may be supported thereon;

Figure 14 is a cross sectional view through Figure 13 on the plane of the line 14—14; and Figure 15 is a cross sectional view similar to Figure 14, but illustrating another way of mounting the work upon the top carriage.

Referring now particularly to the accompanying drawings in which like numerals refer to like parts, the numeral 5 designates the main frame of a band saw constructed in accordance with this invention. This frame, as is customary in machines of this type, is preferably fabricated of plate steel cut and welded into a hollow C-shaped structure having a lower arm 6 which provides the base of the machine and an upper arm 7 spaced vertically thereabove. The space or throat between these two superimposed arms defines the work zone.

An endless saw band 8 trained about four pulleys mounted in the frame—two of which, 9 and 10, are disposed one above the other in the outer end portions of the arms 6 and 7, travels downwardly through the work zone in a straight vertical path. The band is power driven in any suitable manner, and one of the pulleys is adjustable so that the correct tension may be maintained upon the band.

The outer end portion of the upper arm 7 has the usual upper saw guide and backup assembly 11 mounted thereon. This assembly is vertically adjustable to accommodate work of different thicknesses, and includes a post 12, the lower portion of which mounts the actual saw guide and backup 13. A strain gage similar to that forming the subject matter of the copending application of Robert L. Crane, Serial No. 371,302, filed July 30, 1953, is incorporated in the backup assembly.

Although the specific construction of the strain gage and the mounting thereof forms no part of this invention, it may be helpful to point out that the head 14 of the strain gage is mounted upon a bar 15 so fixed to the backup post 12 and so connected with the saw guide and backup 13 as to contain the major deflection resulting from the thrust loads imposed upon the saw band by the work. To this end the thrust imparted to the saw guide and backup is transmitted to the bar 15 through a pivoted lever 16. The result is very accurate response of the strain gage to thrust loads against the saw band.

An operator's platform 17 is also supported from the upper arm 7 of the main frame, the mounting therefor including a post 18 vertically slidable and rotatable in a bearing 18', mounted upon the arm 7. Thus the platform may be swung to and from an operative position over the work and also raised and lowered so that an operator stationed thereon is strategically located to observe the progress of the work. Suitable power means, not shown, are provided to raise and lower the platform. Preferably means are also provided whereby the operator when seated in front of the controls is given a good view of the saw band at its point of entry into the work, and for purposes of illustration, this means has been shown as a periscope-like unit 19 having a viewing screen 20 and prisms 21.

The various push button control switches by which the operator governs the functioning of the machine, and a manually operable control element 22 are mounted to be convenient to an operator stationed on the platform. The control element 22 as will appear hereinafter, controls all of the motions needed to feed the work to the saw, and preferably comprises a steering wheel mounted for in and out axial movement as well as rotation in either direction. These four motions enable the operator to manipulate the work piece as required to cut along any prescribed path regardless of the shape or contour thereof, and despite the fact that the work piece may weigh many thousands of pounds.

The work carrying and feeding mechanism by which the work is supported and moved about, is indicated generally by the numeral 25. It comprises three main elements: a turntable 26 constrained to rotation about an axis coincident with the downward path of the saw band through the work zone; a lower carriage 27 supported upon the turntable and constrained to translatory back and forth motion diametrically across the turntable; and an upper work supporting carriage 28 slidably mounted upon the lower carriage and constrained to horizontal translatory motion at right angles to the motion of the lower carriage with respect to the turntable.

The turntable 26 comprises a rigid annulus 29 fabricated from plate steel and equipped with a plurality of rollers 30, which ride upon a circular track 31. The track 31 is supported by legs 32 at an elevation just above the top of the lower arm 6 of the main frame. Rigidly mounted upon the top of the turntable is a rectangular frame consisting of spaced parallel rails 33 and cross members 34. The rails 33 have upwardly facing ways 35 upon which slides 36 on the underside of the lower carriage 27 ride. In this manner, the lower carriage is mounted and constrained to horizontal translatory motion diametrically across the turntable.

The carriage 27 consists of a rectangular frame preferably also fabricated from plate steel and having spaced parallel longitudinal rails 37 connected by cross members 38, the slides 36 being secured to the undersides of the latter. The longitudinal rails 37 have upwardly facing ways 39 to receive slides 40 on the underside of the upper work supporting carriage 28.

The upper work supporting carriage 28 of necessity comprises a hollow, preferably square frame having opposite rails 41, to which the slides 40 are secured, and cross members 42. A pan-like unit 43 is secured to the top of the carriage 28 to provide a flat work supporting surface bounded by an upwardly projecting edge 43'. This pan-like unit thus serves to receive liquid coolant directed against the saw band and work during operation of the machine. Liquid coolant so used, of course, flows downwardly through the kerf in the work and perhaps also around the sides of the work to be caught by a collecting trough 44 mounted on the lower carriage.

The trough 44 comprises two opposite shed sections 45 sloping downwardly towards one another but spaced apart to define an elongated discharge opening 46 parallel with and equi-spaced from the slides 36. All liquid coolant caught upon the sheds 45 is thus discharged through the opening 46 and onto an elongated collecting tray or pan 47 mounted on the turntable between and equi-spaced from its ways 35. The opposite end portions of this tray or pan 37 slope toward the center where a drain opening 48 receives the liquid coolant and directs it downwardly into a receiving duct 49 in the lower arm of the main frame. From this point, the coolant is of course, conducted to a reservoir not shown, to be recirculated by a suitable pump also not shown.

By means of the structure described, a work piece W, supported upon the upper carriage 28 can be manipulated as required to cut along any given line, but to do this accurately and to make the machine commercially practicable, it is necessary to provide means by which the motions of the carriages will be automatically coordinated and related to one another and with the rotation of the turntable. Such means are provided by this invention but before describing the same, it should be noted that from the standpoint of accommodating the saw band, the turntable need only have a hole at its center large enough for the saw band to pass through, and the lower carriage 27 only needs a narrow slot parallel with its directions of motion, but the upper carriage must be a hollow square.

Rotation is imparted to the turntable by means of a motor 50 mounted upon the main frame and drivingly connected with the turntable through a pinion 51 and a chain belt 52 trained about the turntable. The motor 50 may be electrically driven, but in the preferred embodiment of the invention, it comprises a manually actuated gear pump driven in one direction or the other by rotation of the steering wheel 22. As diagrammatically illustrated in Figure 5B, the motor or gear pump 50 is connected in closed circuit relation with a second gear pump 50' by means of ducts 53. Thus, the driving gear pump 50' and the driven gear pump 50 function substantially like a transmitter Selsyn and a slave Selsyn.

The carriages 27 and 28 are power driven along their ways by hydraulic cylinders. Preferably there are two cylinders for each carriage; the cylinders for moving the lower carriage 27 being designated by the numeral 54 and those for the upper carriage are designated 55. The lower carriage cylinders 54 are fixed to the cross members 38 of the lower carriage and the other cylinders 55 are secured to the rails 41 of the upper carriage 28. The pistons 54' of the lower carriage cylinders are fixed with respect to the turntable by means of rods 57 projecting from opposite ends of the cylinders and secured to arms 58 on the adjacent portions of the turntable. In the same manner, the pistons 55' of the upper carriage cylinders 55, are fixed with respect to the lower carriage by rods 59 projecting from the opposite ends of the cylinders 55 and secured to arms 60 fixed to the ends of rails 37 of the lower carriage.

It follows, therefore, that by simply regulating the pressure at opposite sides of the pistons 54' and 55' any desired relative disposition of the carriages can be effected; and to this end the cylinders of each carriage are connected in a separate closed hydraulic circuit or system, each of which also includes a reversible variable displacement pump, the pump for the lower carriage being designated by the numeral 61 and the pump for the upper carriage by the numeral 62.

The lines (hereinafter to be identified) by which the cylinders 54 and 55 are connected with their respective pumps 61 and 62, must of course, include some way of accommodating rotation of the turntable. Any conventional coupling unit, as for instance one like that shown in Patent No. 1,697,261, or Patent No. 2,308,137, may be employed for this purpose, and since no novelty is claimed for this detail, it has been merely diagrammatically illustrated as at 63 in Figure 5B.

The pumps 61 and 62 are of the type described in Patents Nos. 2,035,465 and 2,064,421, issued March 31, 1936, and December 15, 1936, respectively. It will be understood that consonant with the knowledge of the art as evidenced by the aforesaid patents, the unit 63 includes an outer tubular sleeve or hub which rotates coaxially with the turntable and has the hydraulic lines leading to and from the cylinders connected to it and opening into axially spaced annular chambers in its bore; and a stationary core fitting inside the sleeve and having a corresponding number of circumferentially spaced longitudinal passages therein each connecting with one of the annular chambers and having one of the pump lines connected thereto. As such, they have radial vanes projecting from a rotor which revolves about a fixed axis within an eccentrically adjustable barrel, the vanes having their ends bearing upon the inside of the barrel. Adjustment of the barrel from maximum eccentricity to concentricity with respect to the rotor axis, varies the displacement or delivery of the pump from maximum to zero, and by carrying the adjustment of the barrel through and beyond concentricity the direction of flow is changed. The direction of flow through the pumps, of course, also may be changed by reversing the direction of rotation of their rotors, and since reversal in this manner affords a convenient way of effecting one of the control functions, as will be hereinafter described, the pumps are driven by a single reversible electric motor 64.

The displacement control for the pumps 61 and 62 comprises a pair of Scotch yokes 65 and 66, the crank pins 65' and 66' of which are positively connected together but at 90° to one another, and as depicted in the diagrammatic views by the broken line 67, are positively drivingly connected in one-to-one ratio with the turntable. By virtue of this interconnection between the turntable and the displacement control for the pumps their respective deliveries and hence the rates of motion of the carriages they drive, are at all times coordinated with the position of rotation of the turntable.

The Scotch yoke controls for the pumps 61 and 62 and their connection with the turntable may be considered a resolver by which adjustment of the turntable regulates or resolves the delivery of the pumps to so coordinate and relate the rates of the carriage motions that the resultant or vector sum of their motions and hence the movement of the upper carriage with respect to the saw band is always directly towards the cutting edge of the saw and parallel to the plane of the band, no matter what the position of rotation of the turntable may be and whether the turntable is stationary or not.

As noted hereinbefore, the cylinders 54 and 55 and their respective pumps 61 and 62 together with their connecting lines, constitute two separate closed hydraulic systems. Thus, for the lower carriage 27, the corresponding ends of the lower carriage cylinders 54 are connected with one side of the pump 61 by a line 70 and the opposite corresponding ends of the lower carriage cylinders 54 are connected with the other side of the pump 61 through a line 71. In order to keep this closed hydraulic system filled, a pressure accumulator 72 or its equivalent, is connected into the system at any suitable point.

In like manner, the corresponding ends of the upper carriage cylinders 55 are connected with one side of the pump 62 by a line 73 and the other corresponding ends of the upper carriage cylinders 55 are connected with the other side of the pump 62 by a line 74, the latter line having a pressure accumulator 75 or its equivalent connected therein.

Attention is directed to the fact that all of the lines 70, 71, 73 and 74, pass through a valve unit 76. This valve unit is manually controllable and is required to enable cross feeding of the work at any instant. The manner in which this is accomplished will be hereinafter described.

Bearing in mind that the pumps 61 and 62 develop fluid pressure only when their barrels are eccentric with respect to the axes of their rotors, and that the barrels of the two pumps are connected through the Scotch yokes in such relationship that when one pump is operating at maximum delivery, delivery of the other is zero, so that at least one of the pumps will always deliver as long as the rotors thereof are turning, but this depends upon whether or not the electric motor 64 is running. Moreover, since the motor is reversible and its speed adjustable, control of the motor not only affords a convenient way of starting and stopping the work feed, but in addition, provides means for regulating the rate of feed and also effecting retraction of the work from the saw.

For purposes of illustration, the motor 64 is shown as a reversible D. C. motor controlled by a potentiometer 77, the opposite ends of which are connected across a suitable D. C. source. The slider 78 of the potentiometer is arranged to be moved in one direction or the other by axial "in" and "out" motion of the steering wheel control element 22, it being understood that such axial motion of the steering wheel does not disrupt the driving connection of its shaft with the driving gear pump 52.

With the slider 78 at the mid point of the potentiometer, the motor 64 is stationary. Inward axial movement of the steering wheel moves the slider 78 along the potentiometer to cause the motor 64 to rotate in one direction at a speed depending upon the extent of such inward axial movement of the steering wheel. The farther it is pushed in the faster the motor runs, and consequently the greater will be the output of the pump or pumps then delivering pressure. As depicted in Figures 5A and 5B, the motor 64 is not running, and consequently the entire system is at rest.

*Operation*

Assuming now that it is desired to produce a substantially U-shaped cut in a piece of work, as indicated in broken lines in Figure 7A, and that before the work piece was placed upon the upper work supporting carriage, the carriage was retracted and moved to a position in which the work could be loaded thereon without interference from the saw. This done, the carriage position is adjusted to bring the start of the cut in line with the saw blade as shown in Figure 7. This adjustment would require transverse shifting of both carriages, or in other words, a cross feed motion of the lower carriage to the right.

To effect this cross feed motion, the operator actuates the valve 76 to its "cross feed" setting by pushing in its plunger 80, whereupon the hydraulic circuits of the upper and lower carriages are reoriented as depicted diagrammatically in Figure 6. As a result of this reorientation, the upper carriage cylinders 55 will be connected with the lower carriage pump 61 (these connections being omitted in Figure 6) and the lower carriage cylinders 54 will be connected with the upper carriage pump 62. Accordingly, upon operation of the electric motor 64, the pump 62 (which in this square, straight-away disposition of the carriages is the only pump delivering pressure) will deliver fluid under pressure through line 71 to the right hand end of the cylinders 54, to cause linear motion of the lower carriage toward the right and thereby carry the upper carriage with the work thereon toward the desired starting location. It is to be noted that this cross feed motion of the two carriages in unison is parallel to the elongated discharge opening 46 and crosswise of the plane of the saw band, and also that during this cross feed motion, the turntable is stationary.

The starting and running of the motor 64, is of course, brought about by pushing "in" the steering wheel control element 22, and the rate at which this cross feed motion of the lower carriage takes place depends upon the extent the steering wheel is pushed in. When this cross feed motion has brought the work to its correct position for the start of the cut, the operator restores the steering wheel to its neutral position and resets the valve 76 to the normal operating position. The system is then in the condition diagrammatically depicted in Figure 7.

With the parts in the positions shown in Figure 7, the operator begins the cut by pushing in the steering wheel to start the motor 64, and though the motor runs in the same direction it did during the cross feeding, it now causes the work to be fed to the saw, since the hydraulic circuits have been restored to their normal relationship. The upper carriage pump 62 is now connected with the upper carriage cylinders 55 so that the fluid under pressure delivered by the pump 62 passes through the duct 74 to the ends of the cylinders 55 remote from the operator to cause translation of the upper carriage relative to the lower carriage and thereby bring about feeding of the work to the saw.

During this feeding of the work to the saw the operator of course uses the steering wheel control element 22 to impart such rotation to the turntable as is necessary to keep the work on its course as delineated by the layout line, and if for any reason it is necessary to back the work away from the saw, the operator simply pulls back on the steering wheel to bring the slider 78 across the midpoint of the potentiometer, and thereby effect reversal in the direction of rotation of the motor 64. Also, if the cut veers off the layout line and correction is required, this is quickly done by stopping the feed by moving the control valve to its cross feed setting and then, by pulling or pushing on the steering wheel, effecting cross feed motion as required and in the manner described.

After the first leg of the substantially U-shaped cut is completed, the work must be rotated to the right, which is done by turning the steering wheel control element to effect rotation of the turntable in that direction. With this rotation of the turntable the positions of the Scotch yokes 65 and 66 are automatically adjusted to cause both pumps 61 and 62 to deliver fluid pressure and drive their respective carriages at such related and coordinated rates that the vector sum of their motions is directly towards the saw and, if the turn has been correctly negotiated, along the desired layout line as shown in Figure 8A.

Figure 8B is a vector diagram depicting the motions of the lower and upper carriages in light, full lines, and the resultant vector sum of these motions by the heavy full line. In dotted light and heavy lines this vector diagram also depicts the motions of the carriages and their vector sum to produce a right cross feed motion when the carriages are in the positions shown in Figure 8.

Attention is directed to the fact that when the carriages are in this angularly disposed relationship the Scotch yoke controls for the pumps are maintained in such relative positions by the turntable that when the steering wheel is pushed in or pulled out both pumps 61 and 62 deliver fluid pressure but at rates so coordinated that the net motion of the upper carriage and work thereon is always either directly toward or directly away from the toothed edge of the saw band during normal operation of the machine, and directly to the right or the left during cross feeding.

It should also be observed that during all feeding of the work to the saw, the maximum pressures that can be exerted is controlled by the strain gage. To this end the strain gage is connected into the control circuit for the motor 64 as diagrammatically illustrated by the line 81.

At the completion of the angular portion of the cut being made in Figure 8, the work again must be rotated about the edge of the saw in order to follow the layout line. This requires further clockwise rotation of the turntable an extent to bring the carriages into the orientation shown in Figure 9, and since this disposition of the carriages is 90° removed from that which obtained at the start of the cut, it follows that the feed motion will now be produced, not by movement of the upper carriage across the lower carriage, but rather solely by movement in unison of both carriages across the turntable, or, in other words, by translation of the lower carriage whose motion, of course, is parallel to the elongated opening 46. Accordingly, the Scotch yoke controls for the two pumps are so disposed that only the lower carriage pump 61 delivers fluid pressure, the other pump having its barrel concentric to its rotor axis.

The delivery of the pump 61 is through line 70 to the ends of the cylinders 54 remote from the operator to thereby cause translation of both carriages in unison across the turntable along a line parallel to the plane of the saw band, to thereby feed the work directly against the saw. When this leg of the cut is completed, and the other side of the U-shaped opening is begun, the turntable again must be rotated to align the next adjacent angular portion of the cut with the saw. Such rotation of the turntable brings the carriages into the positions illustrated in Figure 10, and so orients the Scotch yoke controls for the pumps, that both pumps will deliver to cause motion of both carriages at such rates that the vector sum of their motions is again, as always, directly in line with the saw as depicted by the heavy solid line in the vector diagram in Figure 10B. Figure 10B again also illustrates how cross feed would be obtained with the carriages in the relationship shown in Figure 10, the vectored sum of the cross feed motions being indicated by the heavy dotted line of the diagram.

At the completion of the angular portion of the cut being made in Figure 10 orientation of the parts, the turntable is again rotated to align the last straight away leg of the cut with the plane of the saw. This brings the carriages into the relationship shown in Figure 11, where the positions of the carriages are exactly 180° from the positions they occupied at the start of the cut. Accordingly, though the Scotch yokes controlling the pump motors are again disposed to render only the upper carriage pump 62 operative, the delivery of this pump has been reversed so that the fluid delivered thereby flows out through line 73 to the ends of the upper carriage cylinders 55 remote from the operator. This brings about the feeding of the work squarely against the edge of the saw.

Although the cut illustrated in the diagrammatic views 7 to 11 inclusive begins and terminates at an outer edge in the work piece, those skilled in the art will appreciate that the same technique would be used in sawing out an irregularly shaped hole as required for instance, in back-up blocks used to support the dies of large extrusion presses. As is also well understood, where such holes are to be cut into a work piece, it is first necessary to drill or otherwise cut a hole through the work piece and then having cut the saw band, pass it through the hole and weld the ends thereof together.

*Support of work on upper carriage*

The specific manner of supporting the work piece upon the upper carriage depends upon the nature of the piece. Ordinarily, however, it is simply a matter of spanning the hollow frame of the upper carriage by suitably placed beams 85 and resting the work thereon, for with the type of work for which this machine is intended, the work piece usually weighs enough not to require fastening it to the upper carriage. Where a hole is to be cut out, the piece cut from the block may be supported by a beam 86, as shown in Figure 13, the beam being moved as required during the progress of the cut.

It is, of course, also possible to clamp the work to the upper carriage as indicated in Figure 15, this method being employed where the work piece is not heavy enough to remain in place by its own weight.

*The electrical drive and control for the work carrying and feeding mechanism (Figure 12)*

Although the hydraulically powered work carrying and feeding mechanism described is preferred, it is also possible to utilize electric motors and an entirely electrical control system, such a system is diagrammatically illustrated in Figure 12. As there shown, the turntable is driven by an electric motor 90 deriving power from an amplidyne D. C. generator 91 under the control of a transmitter Selsyn 92, directly coupled to the steering wheel control element 22, and a slave Selsyn 93, directly coupled to the turntable, or at least connected thereto in one-to-one ratio. Thus, upon rotation of the steering wheel 22, the resulting electrical misalignment set up between the transmitter Selsyn 92 and the slave Selsyn 93, brings about a controlling impulse, which in turn, governs the output of the generator 91 and causes the motor 90 to rotate the turntable until the slave Selsyn 93 is again in balance with the transmitter Selsyn 92.

The motion of the carriages is effected by electric drive motors 94 and 95 powered from an amplidyne D. C. generator 96, which is governed by a resolver 97, either directly connected to the turntable or connected therewith in one-to-one ratio. The resolver has the same ultimate function as the Scotch yokes of the hydraulic system in that it proportions and coordinates the rates of motion of the carriages produced by the drive motors 94 and 95 to bring about a net motion on the part of the upper carriage and the work thereon directly toward the saw whenever the steering wheel control element is pushed in and to retract the work from the saw whenever it is pulled out.

The control of the drive motors 94 and 95 by means of the axial in and out motion of the steering wheel may be accomplished by the potentiometer arrangement previously described, and also as in the case of the hydraulically powered system, a strain gage responsive to the work pressure upon this saw is connected in the control for the drive motors 94 and 95 to regulate the maximum pressure that may be exerted upon the saw.

In this electrical system reorientation of the drives for the carriages to effect cross feed is obtained by a suitable control 98 provided with a hand lever 99. When this lever is in its neutral position as shown in Figure 12, the system is in its normal condition so that manipulation of the steering wheel 22 causes the turntable to rotate in one direction or the other, and/or effects feeding of the work to the saw or its retraction therefrom. However, upon actuation of the lever 99 to one side or the other, the control circuits are reoriented to effect either right or left cross feed.

From the foregoing description taken in connection with the accompanying drawings, it will be readily apparent to those skilled in the art that this invention provides a band saw which though admirably suited and especially designed for cutting large heavy metal work pieces to irregular shapes, is also highly useful and desirable in connection with band saws of ordinary capacity and uses, and that by its provision for automatically producing the proper direction of work feed from the manipulation of a single, easily operated, control member, much of the human element in the operation of such machines is eliminated, and as a result, the invention may be said to elevate the band saw to the status of a true machine tool.

What is claimed as my invention is:

1. A band saw of the character described comprising: a rigid C-shaped main frame having vertically spaced apart upper and lower arms defining a work zone therebetween; a saw band mounted in the main frame with a stretch thereof traveling downwardly through the work zone along a defined vertical path; a work supporting carriage upon which work to be cut may be mounted; means mounting the carriage for movement thereof in a horizontal plane above but adjacent to the lower arm of the main frame for feeding motion in a direction to carry work thereon against the cutting edge of said stretch of the saw band, and for swiveling motion in either direction about an axis substantially coincident with the cutting edge of said stretch of the saw band; an operator's platform vertically adjustably mounted on the main frame and disposed in front of the toothed edge of the saw band; power means for moving the work supporting carriage;

control instrumentalities for governing said power means, said control instrumentalities including a manually operable control element on the operator's platform; and optical means mounted on the operator's platform and arranged to provide a view of the saw band at its actual point of entry into the work.

2. The band saw of claim 1 further characterized by the fact that said manually operable control element comprises a wheel mounted for axial in and out motion as well as rotation about its axis; and by the fact that the control instrumentalities include means for turning the work carrying carriage about the cutting edge of said stretch of the saw band in response to rotation of the wheel, and means for so moving the work carrying carriage in response to inward axial movement of the wheel that for any angular position of the carriage resulting from rotation of the wheel the work on the carriage is always fed towards the cutting edge of said stretch of the saw band.

3. In a machine of the character described: a tool operating in a fixed axis; means for feeding work to said tool, comprising, a turntable constrained to rotate about said fixed vertical axis; a lower carriage; means mounting said lower carriage upon the turntable for rotation therewith and for linear horizontal movement across the turntable; an upper carriage adapted to receive and support a piece of work; means mounting said upper carriage on the lower carriage for bodily movement therewith and for linear horizontal movement relative to the lower carriage at right angles to the path of linear motion of the lower carriage; a variable speed power driven actuator for moving each carriage along its path of linear motion; manual control means; means connected with the manual control means and the turntable for effecting rotation of the turntable in response to operation of said manual control means; means connected with said manual control means and with the variable speed carriage actuators for concomitantly effecting manually regulated operation of the carriage actuators; and speed regulating means operable coincidentally with rotation of the turntable to coordinate the relative rates at which said carriage actuators drive their respective carriages with the angular position of the turntable, so that for any angular position of the turntable as determined by the path along which cutting is to be performed the movement of the upper carriage carries that part of the work about to be acted upon by the tool always in the same direction toward said tool.

4. In a machine of the character described: a tool operating in a fixed vertical axis; means for feeding work to said tool, comprising, a turntable constrained to rotate about said fixed vertical axis; a lower carriage; means mounting said lower carriage upon the turntable for rotation therewith and for linear horizontal movement across the turntable; an upper carriage adapted to receive and support a piece of work; means mounting said upper carriage on the lower carriage for bodily movement therewith and for linear horizontal movement relative to the lower carriage at right angles to the path of linear motion of the lower carriage; a variable speed power driven actuator for moving each carriage along its path of linear motion; a control device at all times drivingly connected with the turntable; and means governed by said control device so as to be operable coincidentally with rotation of the turntable to so coordinate the rates at which said carriage actuators drive their respective carriages with the angular position of the turntable, that for any angular position of the turntable as determined by the path along which cutting is to be performed, the movement of the upper carriage carries that part of the work about to be acted upon by the tool always in the same direction toward said tool.

5. In a band saw having a saw band, one stretch of which travels along a vertical path, means for carrying and feeding heavy work pieces to said stretch of the saw band, said means comprising: a rotatable turntable having a hole vertically therethrough, through which said stretch of the saw band passes; means constraining the turntable to rotation on a fixed vertical axis passing through said hole and substantially coincident with the cutting edge of said stretch of the saw band; a lower carriage supported upon the turntable for rotation therewith and for motion relative thereto; guide means for the lower carriage constraining such motion thereof relative to the turntable to linear horizontal movement along a path through the turntable axis; an upper carriage adapted to have the work mounted thereon; means mounting said upper carriage on the lower carriage for motion therewith and for motion relative thereto; guide means for the upper carriage constraining such motion thereof relative to the lower carriage to linear horizontal movement at right angles to the path of linear motion of the lower carriage; a power driven actuator connected with each carriage for moving the carriage along its path of motion; adjustable regulating means connected with said actuators to inversely adjust the rates at which said actuators move their respective carriages; drive means for rotating the turntable; a manual control instrumentality; and means interconnecting said manual control instrumentality, said turntable drive means, and said adjustable regulating means to effect such change in the rates of linear motion of the carriages during turntable rotation that for any angular position of the turntable, as determined by the path along which cutting is to be performed, the vector sum of the carriage motions is such that the movement of the upper carriage carries that part of the work about to be sawed always in the same direction toward the cutting edge of said stretch of the saw band and substantially parallel to the plane of said stretch of the saw band.

6. The apparatus of claim 3 further characterized by the provision of a pair of opposed liquid coolant receiving trays on the lower carriage, said trays having their adjacent edges spaced apart to define an elongated opening extending across the lower carriage in a direction parallel to its path of motion relative to the turntable; an elongated liquid coolant receiving tray mounted on the turntable and disposed beneath and in line with the elongated opening of the lower tray to at all times receive coolant flowing through said elongated opening, regardless of the relative positions of the lower carriage and the turntable; said coolant receiving tray on the turntable having a drain opening registering with the axis of the turntable; and means for receiving liquid coolant flowing through said drain opening.

References Cited in the file of this patent

UNITED STATES PATENTS

| | | |
|---|---|---|
| 2,296,967 | Wilkie | Sept. 29, 1942 |
| 2,469,920 | Henkel | May 10, 1949 |
| 2,507,437 | Eserkaln | May 9, 1950 |

FOREIGN PATENTS

| | | |
|---|---|---|
| 1,072,582 | France | Sept. 14, 1954 |